(12) United States Patent
Tsutsumi et al.

(10) Patent No.: US 11,996,897 B2
(45) Date of Patent: May 28, 2024

(54) SOUND FIELD GENERATOR, SOUND FIELD GENERATION METHOD, AND PROGRAM

(71) Applicant: Nippon Telegraph and Telephone Corporation, Tokyo (JP)

(72) Inventors: Kimitaka Tsutsumi, Musashino (JP); Kenta Imaizumi, Musashino (JP); Takashi Sato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 215 days.

(21) Appl. No.: 17/774,916

(22) PCT Filed: Nov. 8, 2019

(86) PCT No.: PCT/JP2019/043898
§ 371 (c)(1),
(2) Date: May 6, 2022

(87) PCT Pub. No.: WO2021/090482
PCT Pub. Date: May 14, 2021

(65) Prior Publication Data
US 2022/0407609 A1   Dec. 22, 2022

(51) Int. Cl.
*H04B 11/00* (2006.01)
*H04R 3/04* (2006.01)

(52) U.S. Cl.
CPC ............... *H04B 11/00* (2013.01); *H04R 3/04* (2013.01)

(58) Field of Classification Search
CPC . H04B 11/00; H04R 3/04; H04R 3/12; H04R 2217/03
See application file for complete search history.

(56) References Cited

U.S. PATENT DOCUMENTS

| | | | | |
|---|---|---|---|---|
| 6,052,336 A | * | 4/2000 | Lowrey, III | G10K 15/02 367/137 |
| 2022/0407609 A1 | * | 12/2022 | Tsutsumi | H04R 3/04 |

FOREIGN PATENT DOCUMENTS

| | | | | |
|---|---|---|---|---|
| JP | 2011239047 | | 11/2011 | |
| WO | WO-2021090482 A1 | * | 5/2021 | ............ H04B 11/00 |
| WO | WO-2021255786 A1 | * | 12/2021 | |

OTHER PUBLICATIONS

Hedberg et al., "A Self-Silenced Sound Beam," Acoustical Physics, 2010, 56(5):637-639.

* cited by examiner

*Primary Examiner* — Daniel Pihulic
(74) *Attorney, Agent, or Firm* — Fish & Richardson P.C.

(57) ABSTRACT

A sound field generation apparatus includes: a first modulation unit modulating an ultrasonic wave signal according to a prescribed modulation system; a second modulation unit modulating the ultrasonic wave signal according to a modulation system different from the modulation system of the first modulation unit; a filter unit changing frequency characteristics of an audible range signal used in modulation of the second modulation unit; a first ultrasonic wave output unit outputting a first ultrasonic wave signal modulated by the first modulation unit; and a second ultrasonic wave output unit outputting a second ultrasonic wave signal modulated by the second modulation unit, wherein the filter unit is set to have filter characteristics to cancel a first audible sound reproduced by the first ultrasonic wave signal with a second audible sound reproduced by the second ultrasonic wave signal at a control point provided outside the sound field.

8 Claims, 5 Drawing Sheets

SOUND FIELD GENERATOR, SOUND FIELD GENERATION METHOD, AND PROGRAM

CROSS-REFERENCE TO RELATED APPLICATIONS

This application is a National Stage application under 35 U.S.C. § 371 of International Application No. PCT/JP2019/043898, having an International Filing Date of Nov. 8, 2019, the disclosure of which is considered part of the disclosure of this application, and is incorporated in its entirety into this application.

TECHNICAL FIELD

The present invention relates to a sound field generation apparatus, a sound field generation method, and a sound field generation program.

BACKGROUND ART

A sound field generation apparatus that presents a sound in a specific range (sound field) is constituted by, for example, a parametric speaker. The parametric speaker is a speaker that uses ultrasonic waves to have sharp directivity. When ultrasonic waves are modulated by a sound signal in an audible range, a waveform emitted from the speaker is distorted due to the nonlinearity of a medium such as air to which a sound is transmitted. As a result, the sound signal in the audible range used in the modulation is generated on a propagation path for the ultrasonic waves. A phenomenon in which the sound signal used in the modulation is generated on the propagation path for the ultrasonic waves is generally known as self-demodulation.

For example, a sound field generation apparatus disclosed in Patent Literature 1 cancels the sound of a primary sound source at a control point with a secondary sound source to suppress a sound propagating in the rear of a listener under feedback control using the primary sound source and the secondary sound source by two parametric speakers and a microphone arranged at the control point.

Further, for example, a sound field generation apparatus disclosed in Non-Patent Literature 1 modulates the ultrasonic waves of two different carrier frequencies with the same sound signal. Then, by performing control to make the amplitudes of two audible sounds generated at a control point equal and invert a phase, the sound field generation apparatus suppresses a sound propagating in the rear of a listener.

CITATION LIST

Patent Literature

[PTL 1] Japanese Patent Application Laid-open No. 2011-239047

Non Patent Literature

[NPL 1] C. M. Hedberg, K. C. E. Haller, and T. Kamakura, "A self-silenced sound beam," in Acoustical Physics, vol. 56, No. 5, pp. 637-639, 2010.

SUMMARY OF THE INVENTION

Technical Problem

However, in the method disclosed in Patent literature 1, both the primary sound source and the secondary sound source are generated in such a manner that the ultrasonic waves of the same carrier frequency are amplitude-modulated by the same sound signal. As a result, since a sound signal in an audible range is similar at all times regardless of a distance, the sound of a specific area is weakened. Further, the method disclosed in Non-Patent Literature 1 uses the two carrier frequencies. Therefore, noise corresponding to the difference between the carrier frequencies is caused, and a sound in a specific range is hard to hear.

As described above, the conventional sound field generation apparatuses have a problem that a sound generated in a specific range (sound field) is hard to hear. Further, the conventional sound field generation apparatuses have a problem that, when two carrier frequencies are used, a cost is increased since the use of two types of ultrasonic wave elements is needed.

The present invention has been made in view of the problems and has an object of providing a sound field generation apparatus that is easy to hear a sound generated in a specific range and is low in cost, a sound field generation method, and a sound field generation program.

Means for Solving the Problem

A sound field generation apparatus according to an aspect of the present invention is a sound field generation apparatus that reproduces an audible sound in a specific range to generate a sound field, the sound field generation apparatus including: a first modulation unit that modulates an ultrasonic wave signal according to a prescribed modulation system; a second modulation unit that modulates the ultrasonic wave signal according to a modulation system different from the modulation system of the first modulation unit; a filter unit that changes frequency characteristics of an audible range signal used in modulation of the second modulation unit; a first ultrasonic wave output unit that outputs a first ultrasonic wave signal modulated by the first modulation unit; and a second ultrasonic wave output unit that outputs a second ultrasonic wave signal modulated by the second modulation unit, wherein the filter unit is set to have filter characteristics to cancel a first audible sound reproduced by the first ultrasonic wave signal with a second audible sound reproduced by the second ultrasonic wave signal at a control point provided outside the sound field.

Further, a sound field generation method according to another aspect of the present invention is a sound field generation method performed by the above sound field generation apparatus, the sound field generation method including: a first modulation step of modulating an ultrasonic wave signal according to a prescribed modulation system; a second modulation step of modulating the ultrasonic wave signal according to a modulation system different from the modulation system of the first modulation step; a filter step of changing frequency characteristics of an audible range signal used in modulation of the second modulation step; a first ultrasonic wave output step of outputting a first ultrasonic wave signal modulated in the first modulation step; and a second ultrasonic wave output step of outputting a second ultrasonic wave signal modulated in the second modulation step, wherein, in the filter step, filter characteristics to cancel a first audible sound reproduced by the first ultrasonic wave signal with a second audible sound reproduced by the second ultrasonic wave signal at a control point provided outside the sound field are set.

A sound field generation program according to another aspect of the present invention is a sound field generation program causing a computer to perform processing including a first modulation step of modulating an ultrasonic wave signal according to a prescribed modulation system, a second modulation step of modulating the ultrasonic wave signal according to a modulation system different from the modulation system of the first modulation step, and a filter step of changing frequency characteristics of an audible range signal used in modulation of the second modulation step, wherein the filter step is processing to generate an audible range signal that cancels a first audible sound reproduced when the first ultrasonic wave signal generated in the first modulation step is self-demodulated with a second audible sound reproduced when the second ultrasonic wave signal generated in the second modulation step is self-demodulated.

Effects of the Invention

According to the present invention, a sound field generation apparatus that is easy to hear a sound generated in a specific range and is low in cost, a sound field generation method, and a sound field generation program can be provided.

DESCRIPTION OF EMBODIMENTS

Hereinafter, embodiments of the present invention will be described using the drawings. The same elements in a plurality of drawings will be denoted by the same reference symbols, and their duplicated descriptions will not be given.

First Embodiment

Figure 1:
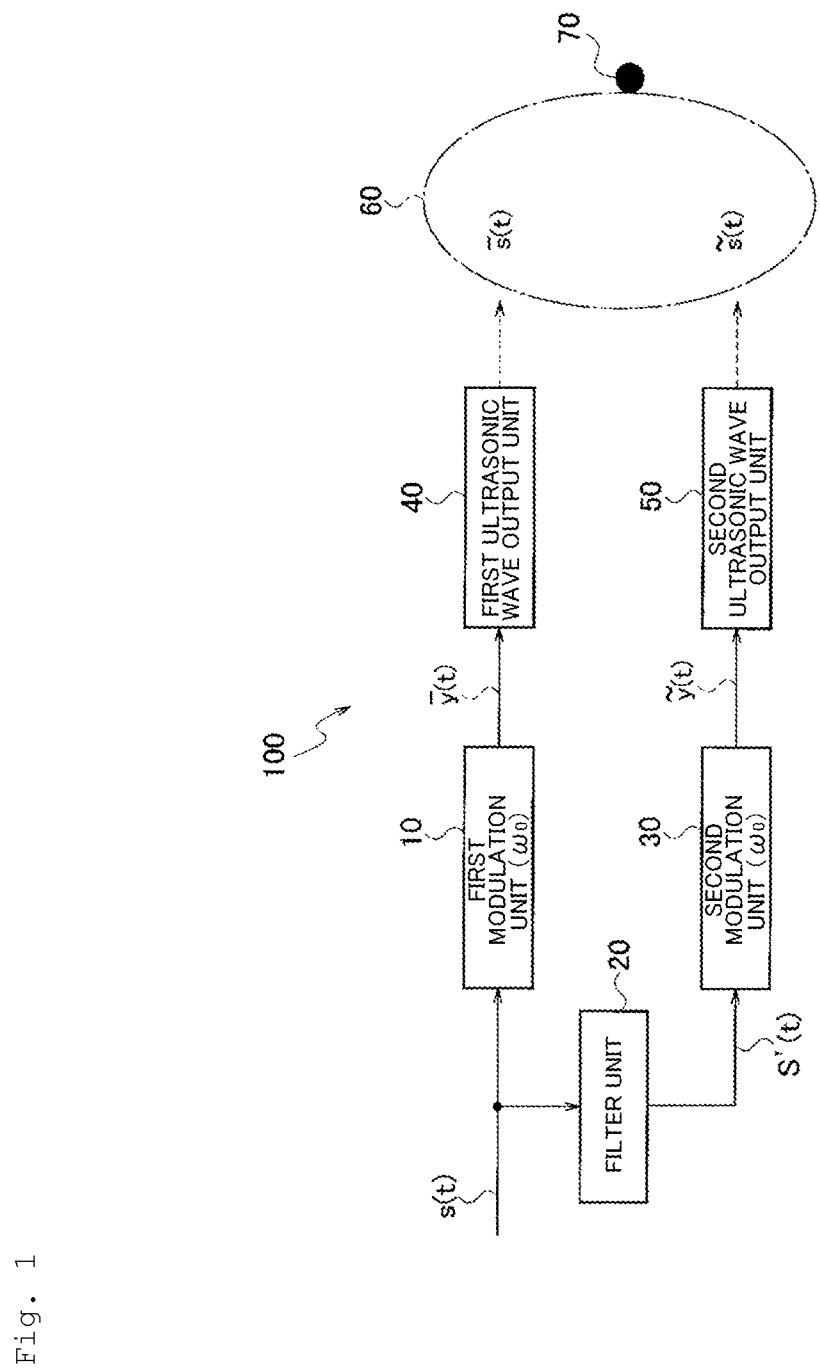
FIG. 1 is a function block diagram showing a configuration example of a sound field generation apparatus according to a first embodiment of the present invention.

FIG. 1 is a block diagram showing a function configuration example of a sound field generation apparatus according to a first embodiment of the present invention. A sound field generation apparatus 100 shown in FIG. 1 is an apparatus that generates a sound field to reproduce an audible sound in a specific range 60 (hereinafter also sometimes called a sound field 60).

As shown in FIG. 1, a control point 70 is provided outside the specific range 60. FIG. 1 shows an example in which the control point 70 is singly provided, but two or more control points 70 may be provided.

The sound field generation apparatus 100 includes a first modulation unit 10, a filter unit 20, a second modulation unit 30, a first ultrasonic wave output unit 40, and a second ultrasonic wave output unit 50. The sound field generation apparatus 100 excluding the first ultrasonic wave output unit 40 and the second ultrasonic wave output unit 50 can be realized by a computer including, for example, a ROM, a RAM, a CPU, or the like.

The first modulation unit 10 modulates an ultrasonic wave signal $\omega_0$ according to a prescribed modulation system. The prescribed modulation system is, for example, frequency modulation.

The second modulation unit 30 modulates the ultrasonic wave signal $\omega_0$ according to a modulation system different from that of the first modulation unit 10. The modulation system of the second modulation unit 30 is, for example, amplitude modulation. Note that the modulation system of the first modulation unit 10 may be the amplitude modulation, and the modulation system of the second modulation unit 30 may be the frequency modulation.

The filter unit 20 changes the frequency characteristics of an audible range signal s(t) used in the modulation of the first modulation unit 10 and the second modulation unit 30.

The first ultrasonic wave output unit 40 outputs a first ultrasonic wave signal y-(t) output from the first modulation unit 10.

The second ultrasonic wave output unit 50 outputs a second ultrasonic wave signal y~(t) output from the second modulation unit 30. Note that the correct representation of - and ~ is the superscript of y (the following Formulae (1) and (2)).

The filter unit 20 is configured to cancel a first audible sound s-(t) reproduced by the first ultrasonic wave signal y-(t) with a second audible sound s~(t) reproduced by the second ultrasonic wave signal y~(t) at the control point 70 provided outside the sound field 60.

Figure 2:
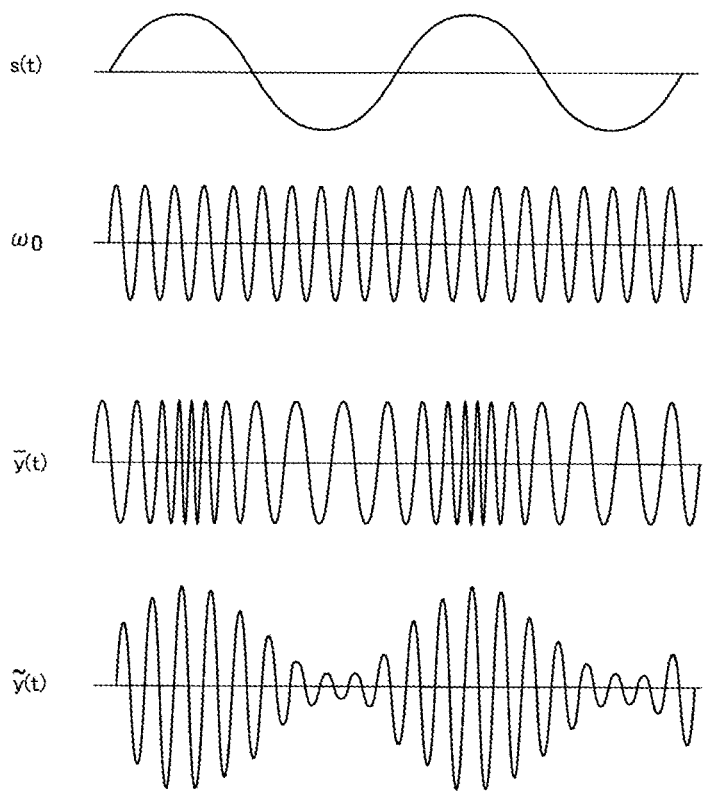
FIG. 2 is a diagram schematically showing each of an audible range signal, an ultrasonic wave signal, an ultrasonic wave signal output from a first modulation unit, and an ultrasonic wave signal output from a second modulation unit shown in FIG. 1.

FIG. 2 is a diagram schematically showing each of an audible range signal s(t), an ultrasonic wave signal $\omega_0$, a first ultrasonic wave signal y-(t), and a second ultrasonic wave signal y~(t) from the top. In FIG. 2, a lateral direction represents a time, and a longitudinal direction represents an amplitude.

A first ultrasonic wave signal y-(t) obtained by frequency-modulating an ultrasonic wave signal $\omega_0$ with an audible range signal s(t) is output from the first ultrasonic wave output unit 40. The output first ultrasonic wave signal y-(t) (Formula (1)) is self-demodulated at the sound field 60 to generate a first audible sound s-(t).

[Math. 1]
$$\bar{y}(t)=A\cos\{\omega_c+\int_0^t s(\tau)d\tau\} \quad (1)$$

An audible range signal s'(t) output from the filter unit 20 is represented by Formula (2).

[Math. 2]
$$s'(t)=\alpha \cdot s(t)*\delta(t-\phi)=\alpha s(t-\phi) \quad (2)$$

Here, s(t) represents an audible range signal input to the filter unit 20, * represents convolution operation, and $\delta(t-\phi)$ represents delay processing for a time $\phi$.

The second modulation unit 30 amplitude-modulates an ultrasonic wave signal $\omega_0$ with an audible range signal s'(t) to generate a second ultrasonic wave signal y~(t).

The second ultrasonic wave output unit 50 outputs a second ultrasonic wave signal y~(t) (Formula (3)). The output second ultrasonic wave signal y~(t) is self-demodulated by the sound field 60 to generate a second audible sound s~(t).

[Math. 3]
$$\tilde{y}(t)=s'(t)\times\cos(\omega_c t) \quad (3)$$

The filter unit 20 has filter characteristics to cancel a first audible sound s-(t) with a second audible sound sy~(t) at the control point 70. That is, in Formula (2), a variable a representing an amplitude and a phase (t−ϕ) for minimizing the target function of the following Formula are used as filter characteristics to generate a second audible sound s~(t−ϕ).

[Math. 4]

$$L(\bar{s},\tilde{s}) = \int |\bar{s}(t) - \tilde{s}(t-\phi)|^2 dt \qquad (4)$$

Note that the superposition of a plurality of sine waves having different frequencies may be used to generate a second audible sound s~(t−ϕ). In this case, an amplitude $a_i$ and a phase (t−$\phi_i$) are configured to be set for each of the sine waves. Note that the representation of the component of a phase (t−ϕ) in the sentences of the following description will be omitted.

[Math. 5]

$$s'(t) = \sum_i a_i \cdot s(t) \cdot \delta(t - \phi_i) \qquad (5)$$

As described above, the sound field generation apparatus 100 according to the present embodiment includes: the first modulation unit 10 that modules an ultrasonic wave signal $\omega_0$ according to a prescribed modulation system; the second modulation unit 30 that modulates the ultrasonic wave signal $\omega_0$ according to a modulation system different from that of the first modulation unit 10; the filter unit 20 that changes the frequency characteristics of an audible range signal s(t) used in the modulation of the second modulation unit 30; the first ultrasonic wave output unit 40 that outputs a first ultrasonic wave signal y-(t) modulated by the first modulation unit 10; and the second ultrasonic wave output unit 50 that outputs a second ultrasonic wave signal y~(t) modulated by the second modulation unit 30. The filter unit 20 is set to have filter characteristics to cancel a first audible sound s-(t) reproduced by the first ultrasonic wave signal y-(t) with a second audible sound y~(t) reproduced by the second ultrasonic wave signal y~(t) at the control point 70 provided outside the sound field 60.

The sound field generation apparatus 100 according to the present embodiment performs control to cancel out two audible sounds generated from one ultrasonic wave signal $\omega_0$ using different modulation systems. Therefore, noise corresponding to the difference between carrier frequencies as in the related art is not caused. Accordingly, a sound inside the sound field 60 can be easily heard.

Further, since one ultrasonic wave signal is used, the same type of ultrasonic wave elements can be used in the first ultrasonic wave output unit 40 and the second ultrasonic wave output unit 50. Accordingly, the cost of the sound field generation apparatus 100 can be reduced.

Next, the first ultrasonic wave output unit 40 and the second ultrasonic wave output unit 50 will be described.

(Ultrasonic Wave Output Units)

Figure 3:
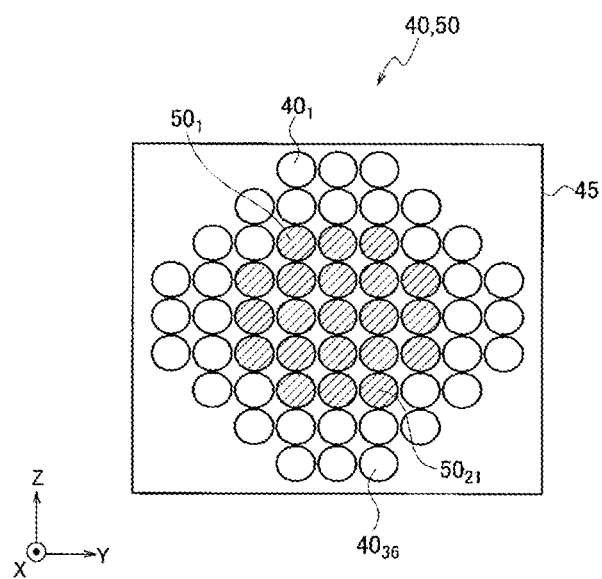
FIG. 3 is a diagram schematically showing the front view of a first ultrasonic wave output unit and a second ultrasonic wave output unit shown in FIG. 1.

FIG. 3 is a diagram schematically showing the front view of the first ultrasonic wave output unit 40 and the second ultrasonic wave output unit 50. As shown in FIG. 3, a plurality of column-shaped ultrasonic wave elements $40_1$ and $50_1$ having a circular front shape are arranged on the surface (YZ surface) of a substrate 45.

In FIG. 3, the first ultrasonic wave output unit 40 is shown by the ultrasonic wave elements $40_1$ represented by white circles and the ultrasonic wave elements $50_1$ represented by shaded circles for the purpose of discriminating the first ultrasonic wave output unit 40 and the second ultrasonic wave output unit 50 from each other. Note that the ultrasonic wave elements $40_1$ and $50_1$ are the same elements (having the same resonance frequency).

For example, 36 pieces of the ultrasonic wave elements $40_1$ are generally circularly arranged to constitute the first ultrasonic wave output unit 40. For example, 21 pieces of the ultrasonic wave elements $50_1$ are arranged inside a ring constituted by the ultrasonic wave elements $40_1$ to $40_{36}$ to constitute the second ultrasonic wave output unit 50.

The ultrasonic wave elements $40_1$ to $40_{36}$ are connected in parallel to each other. The same applies to the ultrasonic wave elements $50_1$ to $50_{21}$.

As described above, the first ultrasonic wave output unit 40 and the second ultrasonic wave output unit 50 are configured in such a manner that a plurality of ultrasonic wave elements 40* and 50* having the same resonance frequency are connected in parallel to each other and arranged on the same plane on the same axis. Thus, two ultrasonic wave output units can be constituted by one type of ultrasonic wave elements, and their costs can be reduced.

Note that a speaker amplifier (not shown) may be put between the first modulation unit 10 and the first ultrasonic wave output unit 40 and between the second modulation unit 30 and the second ultrasonic wave output unit 50 to enable the adjustment of the sound pressures of a first audible sound s-(t) and a second audible sound sy~(t).

(Sound Field Reproduction Method)

Figure 4:
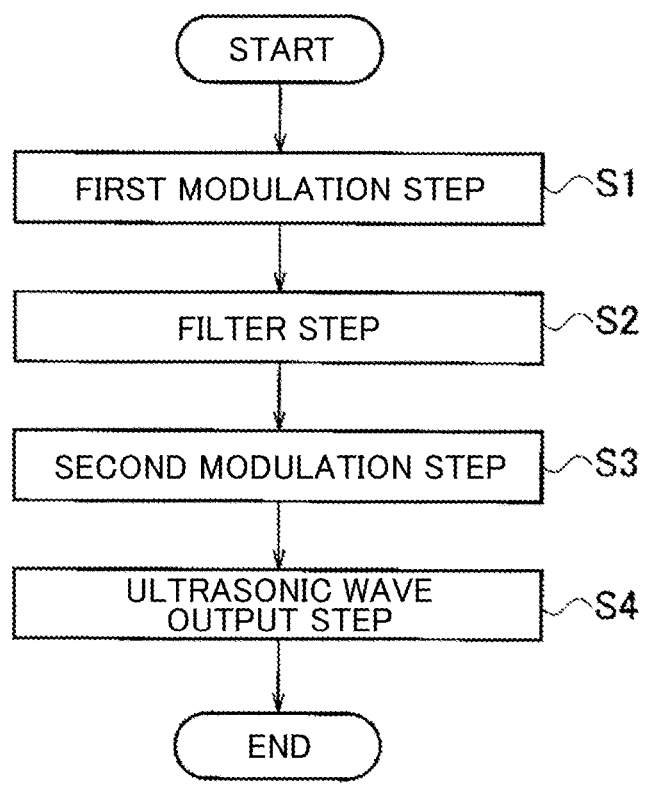
FIG. 4 is a flowchart showing the processing procedure of a sound field reproduction method performed by the sound field generation apparatus shown in FIG. 1.

FIG. 4 is a flowchart showing the processing procedure of a sound field generation method performed by the above sound field generation apparatus 100.

The first modulation unit 10 constituting the sound field generation apparatus 100 performs a first modulation step S1 of modulating an ultrasonic wave signal $\omega_0$ according to a prescribed modulation system. The prescribed modulation system is, for example, frequency modulation. In the first modulation step S1, the ultrasonic wave signal $\omega_0$ is frequency-modulated by an audible range signal s(t) to generate a first ultrasonic wave signal y-(t).

The filter unit 20 performs a filter step S2 of changing the frequency characteristics of the audible range signal s(t) used in the modulation of a second modulation step S3. In the filter step S2, the audible range signal s(t) input to the second modulation unit 30 is filtered to generate an audible range signal s'(t) having different frequency characteristics.

The second modulation unit 30 performs a second modulation step S2 of modulating the ultrasonic wave signal $\omega_0$ according to a modulation system different from that of the first modulation step S1. In the second modulation step S3, the ultrasonic wave signal $\omega_0$ is amplitude-modulated by the audible range signal s'(t) to generate a second ultrasonic wave signal y~(t).

The first ultrasonic wave output unit 40 and the second ultrasonic wave output unit 50 perform an ultrasonic wave output step S4 of outputting the first ultrasonic wave signal y-(t) generated in the first modulation step S1 and the second ultrasonic wave signal y~(t) generated in the second modulation step S3 to the sound field 60.

In filter step S2, filter characteristics to cancel a first audible sound s-(t) reproduced by the first ultrasonic wave signal y-(t) with a second audible sound sy~(t) reproduced by the second ultrasonic wave signal y~(t) at the control point 70 provided outside the sound field 60 are set.

As described above, the sound field generation method according to the present embodiment is a sound field generation method performed by the above sound field generation apparatus 100, the sound field generation method including: the first modulation step S1 of modulating an ultrasonic wave signal $\omega_0$ according to a prescribed modulation system; the second modulation step S3 of modulating the ultrasonic wave signal $\omega_0$ according to a modulation system different from that of the first modulation step S1; the filter step S2 of changing the frequency characteristics of an audible range signal s(t) used in the modulation of the first modulation step S1 and the second modulation step S3; the first ultrasonic wave output step (ultrasonic wave output step S4) of outputting a first ultrasonic wave signal y-(t) modulated in the first modulation step S1; and the second ultrasonic wave output step (ultrasonic wave output step S4) of outputting a second ultrasonic wave signal y~(t) modulated in the second modulation step S3. In the filter step S2, filter characteristics to cancel a first audible sound s-(t) reproduced by the first ultrasonic wave signal y-(t) with a second audible sound sy~(t) reproduced by the second ultrasonic wave signal y~(t) at the control point 70 provided outside the sound field 60 are set.

According to the sound field generation method of the present embodiment, noise corresponding to the difference between carrier frequencies as in the related art is not caused. Further, the same type of ultrasonic wave elements can be used in the first ultrasonic wave output unit 40 and the second ultrasonic wave output unit 50, and therefore costs can be reduced.

Second Embodiment

Figure 5:
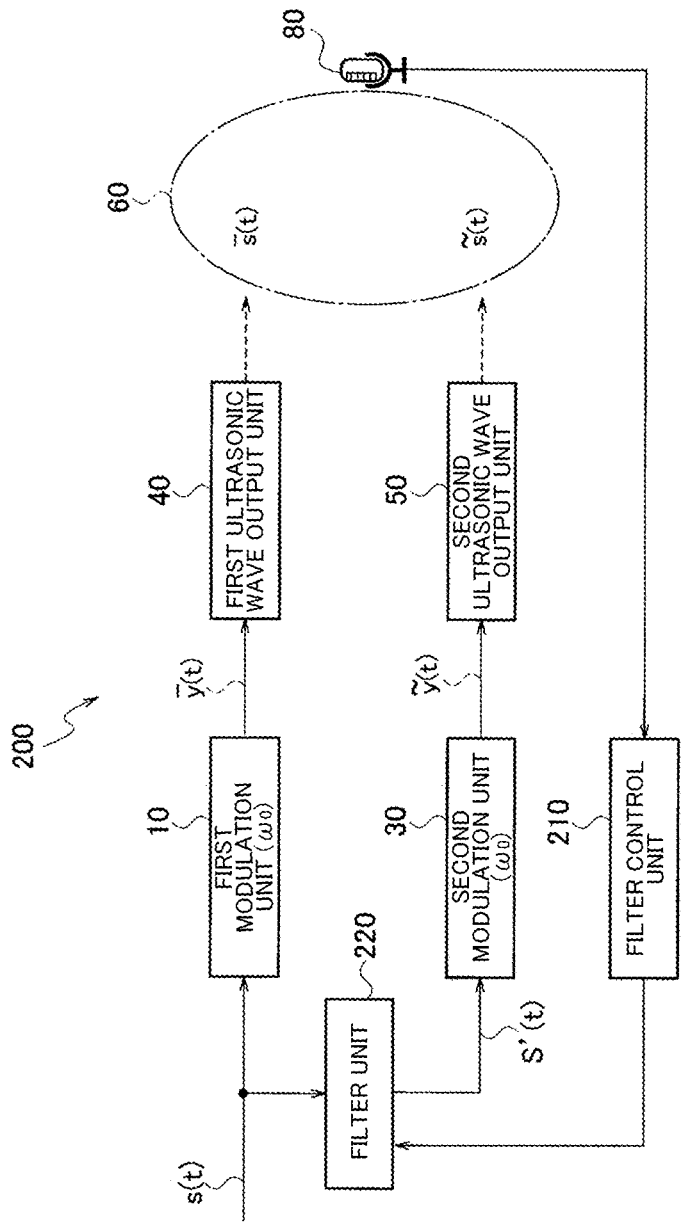
FIG. 5 is a function block diagram showing a configuration example of a sound field generation apparatus according to a second embodiment of the present invention.

FIG. 5 is a block diagram showing a function configuration example of a sound field generation apparatus according to a second embodiment of the present invention. A sound field generation apparatus 200 shown in FIG. 5 is different from the sound field generation apparatus 100 in that a microphone 80, a filter control unit 210, and a filter unit 220 are provided.

The microphone 80 is arranged at the position of the control point 70 provided outside a sound field 60. When a plurality of the control points 70 exist, a microphone may be arranged at each of the control points.

The filter control unit 210 generates the filter characteristics of the filter unit 220 to cancel a sound signal collected by the microphone 80.

The filter unit 220 changes the frequency characteristics of an audible range signal s(t) on the basis of the filter characteristics generated by the filter control unit 210. The filter unit 220 generates an audible range signal s'(t) having frequency characteristics different from those of the audible range signal s(t) input to a first modulation unit 10.

For a sound signal collected by the microphone 80 arranged at the control point 70 as described above, the filter characteristics of the filter unit 220 are determined by feedback control.

As described above, the sound field generation apparatus 200 according to the present embodiment includes the microphone 80 arranged at the control point 70 and the filter control unit 210 that generates filter characteristics to cancel a sound signal collected by the microphone 80. The filter unit 220 changes the frequency characteristics of an audible range signal s(t) on the basis of the above filter characteristics. Thus, an audible sound leaking to the outside of the sound field 60 can be reliably cancelled.

The sound field generation apparatuses 100 and 200 can be realized by general-purpose computer systems (not shown) except for the first ultrasonic wave output unit 40, the second ultrasonic wave output unit 50, and the microphone 80. For example, in a general-purpose computer system including a CPU, a memory, a storage, a communication unit, an input unit, and an output unit, the respective functions of the sound field generation apparatuses 100 and 200 are realized when the CPU performs a prescribed program loaded on the memory. The prescribed program can be recorded on a computer-readable recording medium such as an HDD, an SSD, a USB memory, a CD-ROM, a DVD-ROM, and an MO, or can be distributed via a network.

The present invention is not limited to the above embodiments but may be modified within the scope of the gist. An example in which the modulation system of the first modulation unit 10 is the frequency modulation and the modulation system of the second modulation unit 30 is the amplitude modulation is described above, but the present invention is not limited to the example. The modulation system of the first modulation unit 10 may be the amplitude modulation, and the modulation system of the second modulation unit 30 may be the frequency modulation.

Further, an example in which the first ultrasonic wave output unit 40 and the second ultrasonic wave output unit 50 are annularly and internally arranged on the same plane is described above, but the present invention is not limited to the example. However, the first ultrasonic wave output unit 40 and the second ultrasonic wave output unit 50 may be constituted by other materials.

As described above, the present invention includes various embodiments or the like not described here as a matter of course. Accordingly, the technical scope of the present invention should be determined only by matters used to specify the invention according to claims that are reasonable from the above description.

REFERENCE SIGNS LIST

10 First modulation unit
20 Filter unit
30 Second modulation unit
40 First ultrasonic wave output unit
45 Substrate
50 Second ultrasonic wave output unit
60 Sound field
70 Control point
80 Microphone
100, 200 Sound field generation apparatus
s(t) Audible range signal
y-(t) First ultrasonic wave signal
y~(t) Second ultrasonic wave signal
s-(t) First audible sound
sy~(t) Second audible sound

The invention claimed is:

1. A sound field generation apparatus for reproducing an audible sound in a specific range to generate a sound field, the sound field generation apparatus comprising:
   a first modulation unit, implemented using one or more computing devices, that modulates an ultrasonic wave signal according to a prescribed modulation system;
   a second modulation unit, implemented using one or more computing devices, that modulates the ultrasonic wave signal according to a modulation system different from the modulation system of the first modulation unit;
   a filter unit, implemented using one or more computing devices, that changes frequency characteristics of an audible range signal used in the modulation of the second modulation unit;

a first ultrasonic wave output unit, implemented using one or more computing devices, that outputs a first ultrasonic wave signal modulated by the first modulation unit; and a second ultrasonic wave output unit, implemented using one or more computing devices, that outputs a second ultrasonic wave signal modulated by the second modulation unit, wherein the filter unit is set to have filter characteristics to cancel a first audible sound reproduced by the first ultrasonic wave signal with a second audible sound reproduced by the second ultrasonic wave signal at a control point provided at an outside of the sound field.

2. The sound field generation apparatus according to claim 1, wherein the prescribed modulation system is amplitude modulation or frequency modulation.

3. The sound field generation apparatus according to claim 1, further comprising:

a microphone that is arranged at the control point; and a filter control unit, implemented using one or more computing devices, that generates filter characteristics to cancel a sound signal collected by the microphone, wherein the filter unit changes the frequency characteristics of the audible range signal based on the generated filter characteristics.

4. The sound field generation apparatus according to claim 1, wherein the first ultrasonic wave output unit and the second ultrasonic wave output unit are configured in such a manner that a plurality of ultrasonic wave elements each having a same resonance frequency are connected in parallel to each other and arranged on a same plane on a same axis.

5. A sound field generation method performed by a sound field generation apparatus, implemented using one or more computing devices, the sound field generation method comprising:

a first modulation step of modulating an ultrasonic wave signal according to a prescribed modulation system;

a second modulation step of modulating the ultrasonic wave signal according to a modulation system different from the modulation system of the first modulation step;

a filter step of changing frequency characteristics of an audible range signal used in the modulation of the second modulation step;

a first ultrasonic wave output step of outputting a first ultrasonic wave signal modulated in the first modulation step; and a second ultrasonic wave output step of outputting a second ultrasonic wave signal modulated in the second modulation step, wherein, in the filter step, filter characteristics to cancel a first audible sound reproduced by the first ultrasonic wave signal with a second audible sound reproduced by the second ultrasonic wave signal at a control point provided at an outside of the sound field are set.

6. A non-transitory recording medium storing a sound field generation program, wherein execution of the sound field generation program causes one or more computers to perform operations comprising:

a first modulation step of modulating an ultrasonic wave signal according to a prescribed modulation system, a second modulation step of modulating the ultrasonic wave signal according to a modulation system different from the modulation system of the first modulation step, and a filter step of changing frequency characteristics of an audible range signal used in the modulation of the second modulation step, wherein the filter step generates an audible range signal that cancels (i) a first audible sound reproduced based on the ultrasonic wave signal generated in the first modulation step being self-demodulated with (ii) a second audible sound reproduced based on the ultrasonic wave signal generated in the second modulation step being self-demodulated.

7. The recording medium according to claim 6, wherein the prescribed modulation system is amplitude modulation or frequency modulation.

8. The recording medium according to claim 6, wherein the operations comprise:

generating filter characteristics to cancel a sound signal collected by a microphone that is arranged at a control point provided at an outside of a sound field, wherein the frequency characteristics of the audible range signal are changed based on the generated filter characteristics.

* * * * *